No. 782,587. Patented February 14, 1905.

UNITED STATES PATENT OFFICE.

J. W. VAUGHAN AND CHARLES S. HORNER, OF EATON RAPIDS, MICHIGAN.

PROCESS OF PREPARING PEAT FOR FUEL.

SPECIFICATION forming part of Letters Patent No. 782,587, dated February 14, 1905.

Application filed July 11, 1904. Serial No. 215,970.

*To all whom it may concern:*

Be it known that we, J. W. VAUGHAN and CHARLES S. HORNER, citizens of the United States, residing at Eaton Rapids, county of Eaton, State of Michigan, have invented a certain new and useful Improvement in Processes of Preparing Peat for Fuel; and we declare the following to be a full, clear, and exact description of the invention, such as will enable others skilled in the art to which it pertains to make and use the same.

This invention relates to the process of preparing bog-peat for fuel.

It has for its object an improved process of quickly and thoroughly drying and disintegrating the peat and preparing it for use as fuel.

In carrying out this process the peat taken from the bed from which it is mined is subjected to the mechanical extraction of water therefrom either by presses or by centrifugal machines, which extract and remove the water to as great an extent as is possible by such process. It is thereafter subjected to an electric current of a voltage and amperage sufficient to rapidly heat it to a temperature that breaks it down and disintegrates and liberates water that is or has been contained within the interstices of the particles of peat and which was so closely associated therewith that it was not easily removable by mechanical means. After the peat has been subjected to the electrical current for a short period of time it is again subjected to mechanical action to remove the water which has been liberated by the action of the electric current, either pressure or a centrifugal machine, after which the peat, now substantially dry, is compressed or molded into briquets and is ready for use.

Under the electric treatment the peat material is not heated to a temperature high enough to burn it or destroy it in any degree, and, in fact, the presence of the liberated water or the steam therefrom prevents the temperature from rising to such a degree that it will burn or char the material, and the material is subjected to the electric current only long enough to liberate the contained water and not long enough to drive the water entirely away, much of which remains mingled with the peat material until it is subsequently subjected to mechanical separation therefrom.

In practice we have used an alternating current of electricity for the purpose of breaking down the peat and liberating the water therefrom which has produced very satisfactory results much more satisfactory than those we have secured from the use of the direct current.

What we claim is—

1. The process of drying peat, consisting of first mechanically separating from the peat the contained water to as great an extent as is practically possible, next subjecting the partially-dried peat to an electric current to disintegrate the same and liberate contained water and finally again mechanically separating the liberated water from the mass, substantially as described.

2. The process of preparing peat for fuel, consisting in mechanically separating from the mined peat the water contained therein to as great a degree as is possible in the first instance, subjecting the partially-dried material to an electric current to liberate contained water and contemporaneously separating the liberated water from the peat material, substantially as described.

In testimony whereof we sign this specification in the presence of two witnesses.

J. W. VAUGHAN.
CHARLES S. HORNER.

Witnesses:
ALANSON OSBORN,
JNO. D. BIRNEY.